(12) United States Patent
Davis et al.

(10) Patent No.: US 7,021,602 B2
(45) Date of Patent: Apr. 4, 2006

(54) VALVE, ACTUATOR AND CONTROL SYSTEM THEREFOR

(75) Inventors: Albert S. Davis, Richmond, TX (US); John M. Saldivar, Richmond, TX (US); David R. Mefford, The Woodlands, TX (US); Frank J. Arriens, Houston, TX (US); Daryl L. Ard, Kemah, TX (US)

(73) Assignee: Cooper Cameron Corporation, Houston, TX (US)

( * ) Notice: Subject to any disclaimer, the term of this patent is extended or adjusted under 35 U.S.C. 154(b) by 0 days.

(21) Appl. No.: 11/211,365

(22) Filed: Aug. 25, 2005

(65) Prior Publication Data

US 2005/0279955 A1 Dec. 22, 2005

Related U.S. Application Data

(63) Continuation of application No. 10/814,461, filed on Mar. 31, 2004.

(51) Int. Cl.
*F16K 31/12* (2006.01)

(52) U.S. Cl. .............................. 251/29; 251/28; 251/57; 60/415

(58) Field of Classification Search .................. 251/26, 251/28, 29, 31, 57; 60/415
See application file for complete search history.

(56) References Cited

U.S. PATENT DOCUMENTS

| 2,896,582 | A | * | 7/1959 | Justice ......................... 91/407 |
| 3,648,458 | A | * | 3/1972 | McAlister ..................... 60/415 |
| 4,460,152 | A | * | 7/1984 | DiPasquale et al. .......... 251/26 |
| 6,494,434 | B1 | * | 12/2002 | Geiser ......................... 251/229 |

* cited by examiner

*Primary Examiner*—Edward K. Look
*Assistant Examiner*—John K. Fristoe, Jr.
(74) *Attorney, Agent, or Firm*—Conley, Rose P.C.; Peter Bielinski (57) ABSTRACT

A hydraulic control system for a valve actuator comprising a first control valve that regulates fluid communication from a fluid pressure source to a first fluid supply tank that is fluidly connected to the valve actuator. A second control valve regulates fluid communication from the fluid pressure source to a second fluid supply tank that is fluidly connected to the valve actuator. A flow control member regulates fluid communication between the first and second fluid supply tanks and an exhaust valve that regulates fluid communication between the first and second fluid supply tanks and an outlet.

20 Claims, 7 Drawing Sheets

VALVE, ACTUATOR AND CONTROL SYSTEM THEREFOR

BACKGROUND OF THE INVENTION

1. Field of the Invention

This invention relates to a system of a hydraulic actuator for operating a valve between open and closed positions and the control system used to regulate the operation of the actuator. This system is particularly suited for operation of ball valves used in the oil and gas industry. These ball valves are typically used in gas pipelines to control the flow of gas through the pipeline. The actuator of the present invention uses gas pressure from the pipeline to power the actuator. In the event gas pressure from the pipeline is unavailable or inaccessible, a pair of manual hand pumps are incorporated to allow operation of the actuator and valve.

Prior actuators utilizing the gas pressure of the pipeline as a power source typically have a double acting piston upon which the gas acts to drive the actuator and hence the valve to be opened or closed. These actuators have vented the gas pressure from one side of the double acting piston as gas pressure is applied to the other side of the piston. This venting is necessary to ensure that equal pressure is not acting on both sides of the piston simultaneously. In this event, the force acting on both sides of the piston would balance and the actuator would fail to operate or be "pressure locked" as commonly referred to in the industry.

As a result of the need to vent each side of the actuator piston to ensure proper operation, the gas pressure is usually vented to atmosphere. This gas is not a pure gas but in fact has hydrocarbon liquids entrained in the gas, known as condensate in the industry. When this venting to atmosphere occurs, the hydrocarbon liquid condensate condenses and becomes a sticky, unsightly oily residue on the ground adjacent the valve and actuator. In recent years this venting to the atmosphere of the gas has raised environmental concerns due to possible contamination of the ground and groundwater by this oily residue.

Another concern with prior valve, actuator and control system assemblies has been the interface and operation of the manual hand pumps that are required to operate the actuator and valve when gas pressure from the pipeline is not available. This may occur during new installations when the pipeline has not been filled with gas yet and opening or closing of the valve is needed. Other times when maintenance is to be performed on the valve or actuator, the pipeline must be bled of gas pressure as a safety precaution. When it is desired to operate the valve prior to subsequent pressurization of the pipeline, the ability to operate the valve and actuator manually is required. Prior valve, actuator and control system assemblies have had problems in their design and operation that allowed possible scenarios in which pressurization of the pipeline and thus the actuator, could result in inadvertent operation of the actuator while manual operation of the actuator was occurring and possible injury to an operator. It is therefore desirable to have a valve, actuator and control system assembly that allows minimizing the size of the actuator and operation of the control system in a manual mode that automatically prevents accidental operation by pipeline pressure. The valve, actuator and control system of the present invention offers such novel features.

2. Description of Related Art

U.S. Pat. No. 6,231,027 B1 to G. S. Baker et al. shows a valve actuator that utilizes a variable helix angle to generate greater operating torque near the end of its travel.

A subsea rotary adjusting device for valves is disclosed in PCT International Publication No. WO 02/37008 A1 to K. Biester et al. The device utilizes a helical slot in a sleeve to translate axial motion into rotary motion.

PCT International Publication No. WO 03/025428 A1 to K. Biester et al. shows a travel multiplying device utilizing three concentric pipes with spherical linking elements to magnify relative longitudinal motion between adjacent pipes.

SUMMARY OF THE INVENTION

The present invention relates to a system of a hydraulic actuator for operating a valve between open and closed positions, the valve itself and the control system used to regulate the operation of the actuator. The valve is installed in a gas pipeline, typically used in the oil and gas industry, to control flow through the pipeline. The actuator of the present invention uses gas pressure from the pipeline to power the actuator.

The valve is a ball valve that uses a spherically shaped ball to control fluid flow through the valve. End flanges are welded to the outer body shell for connection to mating pipeline connections. A quarter turn of the ball moves the valve from open to closed positions. The valve actuator is mounted on top of the valve and rotates the ball between open and closed positions when operated.

The valve actuator is comprised of a lower actuator housing with a bore therethrough to which an actuator cylinder housing having a counterbore is secured in sealing engagement to a first end of the lower actuator housing. A lower actuator plate with a bore is secured to the second end of the lower actuator housing. A helix sleeve is secured within the lower actuator housing bore and seals therein. The helix sleeve has a pair of helical slots cut in its wall and a reduced diameter bore on one end. An actuator drive shaft extends between the actuator cylinder housing bore and the reduced diameter bore of the helix sleeve and seals within these bores and is axially restrained between them.

An actuator piston sleeve is sealingly disposed in the annulus between the actuator drive shaft and the actuator cylinder housing with the actuator piston sleeve axially moveable in response to hydraulic pressure. The actuator piston sleeve has a reduced diameter portion extending into the annulus between the actuator drive shaft and the helix sleeve with the reduced diameter portion of the actuator piston sleeve sealing on the actuator drive shaft and the reduced diameter portion of the actuator piston sleeve having a pair of axially disposed slots. A pair of rollers are attached to the reduced diameter portion of the actuator piston sleeve and engage the helical slots in the helix sleeve and a second pair of rollers are attached to the actuator drive shaft and engage the axially disposed slots in the reduced diameter portion of the actuator piston sleeve such that reciprocation of the actuator piston sleeve causes rotation of the actuator drive shaft.

The hydraulic control system for the valve actuator is comprised of open and close circuits with each circuit including a control valve, a pair of pilot operated valves and a fluid supply tank for supplying control fluid under pressure to the appropriate actuator function. The outlet port of the second pilot operated valve in each circuit is connected to an exhaust orifice valve. The control valve in each circuit receives pressurized gas from an outlet on the pipeline and directs this pressurized gas to the appropriate tank when the control valve is operated. This pressurized gas is also used to operate the pilot operated valves to control venting of pressure from one tank while the other is being pressurized to prevent pressure lock and allow equalization of pressure between the tanks after the valve is moved to its fully open or closed position.

A principal object of the present invention is to provide a valve, actuator and control system that allows minimizing the size of the actuator and operation of the control system in a manual mode that automatically prevents accidental operation by pipeline pressure.

Another object of the present invention is to provide a valve, actuator and control system that is modular in construction to allow adaptation to different valve sizes.

A final object of the present invention is to provide a valve, actuator and control system for gas pipelines that minimizes the condensate vented to the atmosphere during operation.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein:

FIG. 2 comprises a perspective view from the opposite side with partial sectional views of the valve and actuator to show the main components.

DESCRIPTION OF THE PREFERRED EMBODIMENTS

Figure 1:
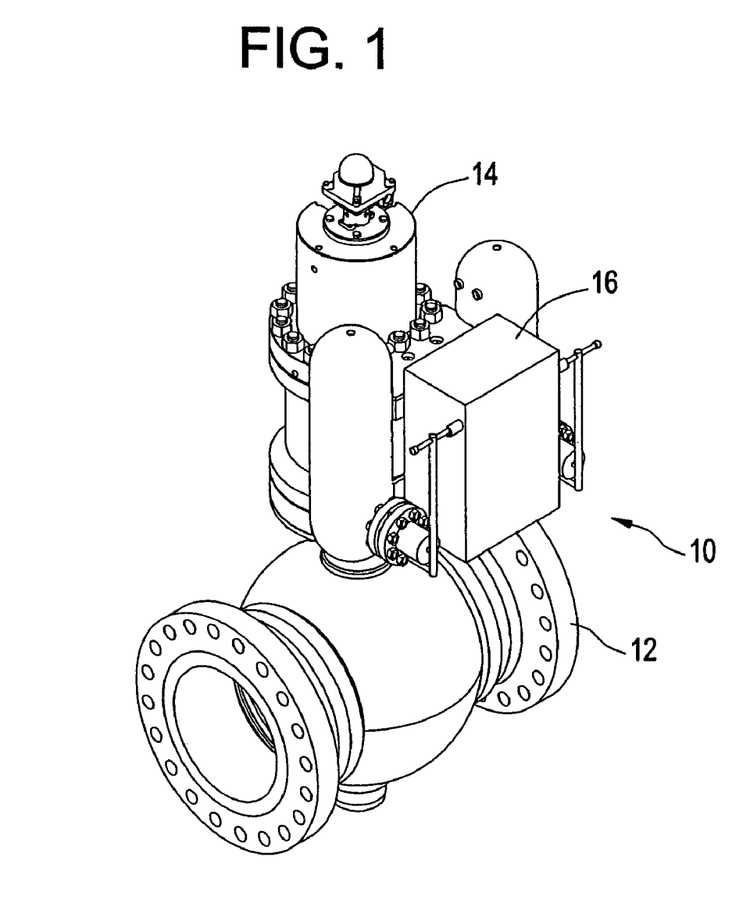
FIG. 1 comprises a perspective view of a system for controlling fluid flow through a pipeline including valve, actuator and control system assembled together.
Figure 2:
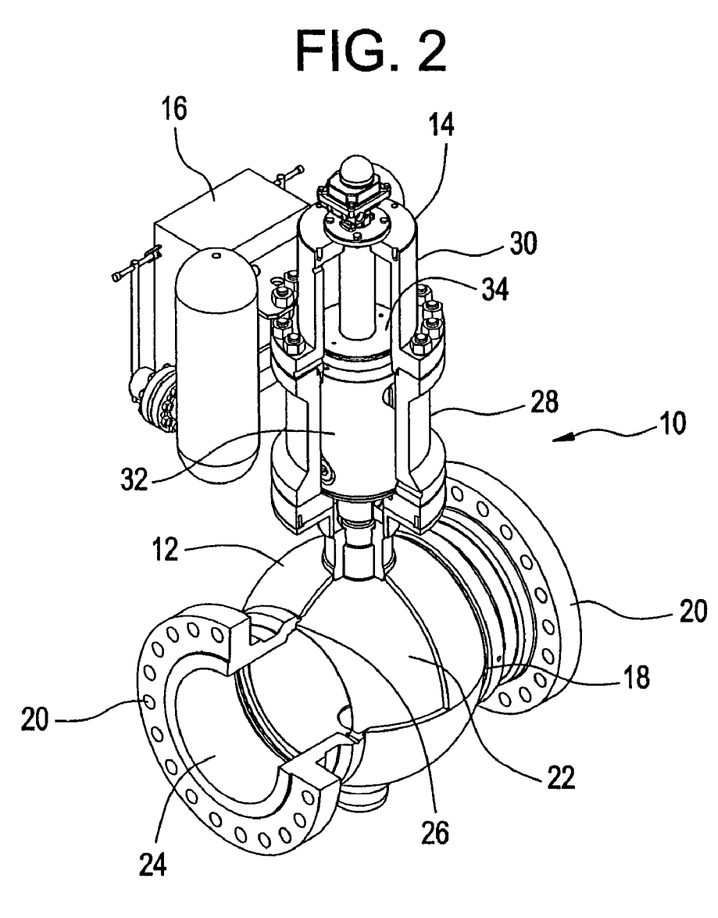
FIG. 2 is a perspective view from the opposite side with partial sectional views of valve 12 and actuator 14 to show the main components, sectional view of a wellhead system with the right half of the view showing a combination of standard casing hangers and packoff assemblies and the left half of the view showing a combination of casing hangers and packoff assemblies for emergency situations in which the casing sticks in the well bore while being lowered into position.

With reference to the drawings, and particularly to FIG. 1 a perspective view of a system 10 for controlling fluid flow through a pipeline including valve 12, actuator 14 and control system 16 assembled together is shown. FIG. 2 is a perspective view from the opposite side with partial sectional views of valve 12 and actuator 14 to show the main components. Valve 12 is a ball valve of the type commonly used in the oil and gas industry, with a welded body 18 and end flanges 20 for installing valve 12 into a pipeline (not shown) through which valve 12 will control the flow of oil and gas. Valve 12 includes a flow controlling member or ball 22, disposed in welded body 18, with a bore 24 therethrough. Seal elements 26 in welded body 18 seal against ball 22. Rotation of ball 22 a quarter turn by actuator 14 closes valve 12.

Figure 3:
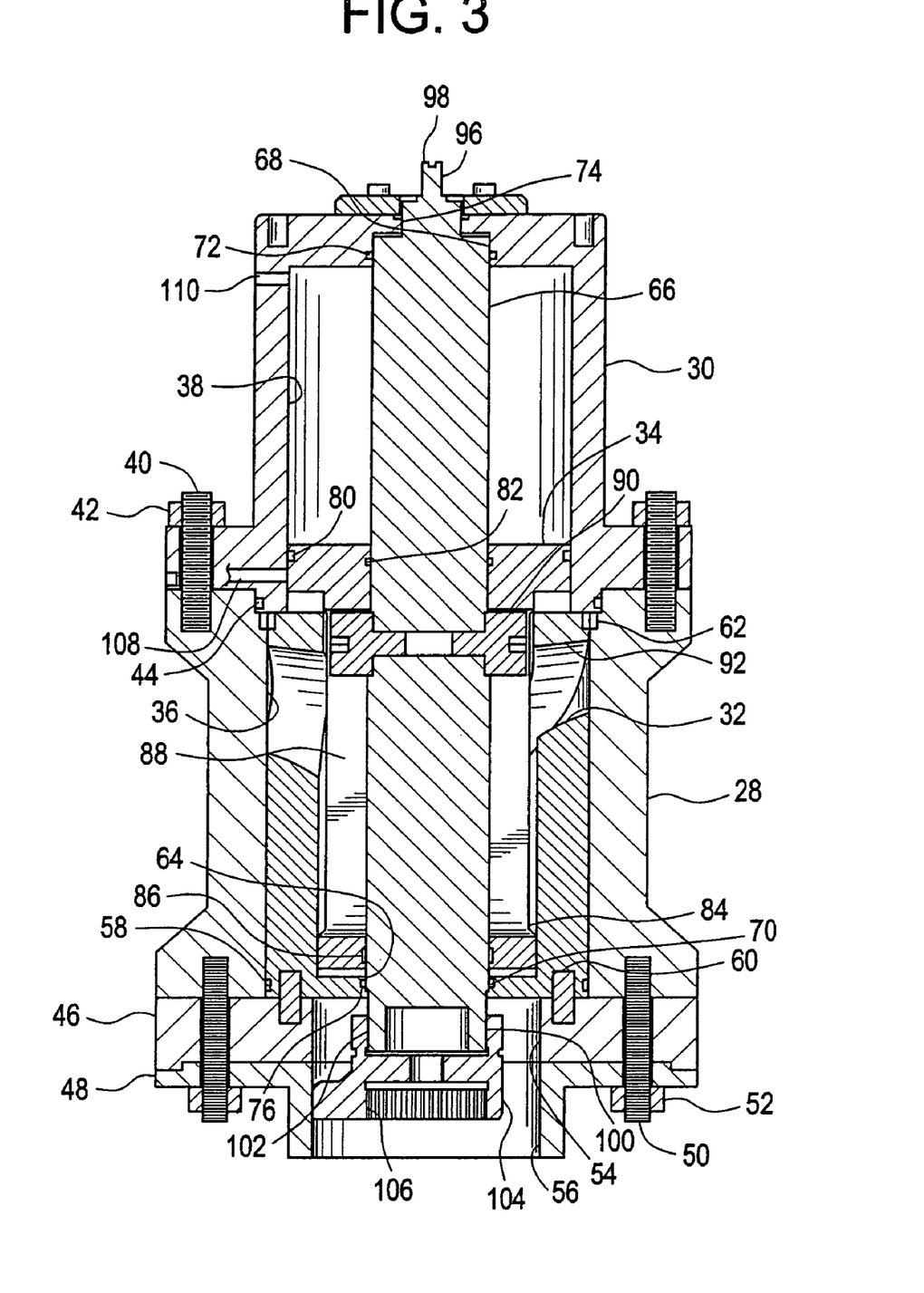
FIG. 3 comprises a sectional view of the valve actuator in the valve closed position.
Figure 4:
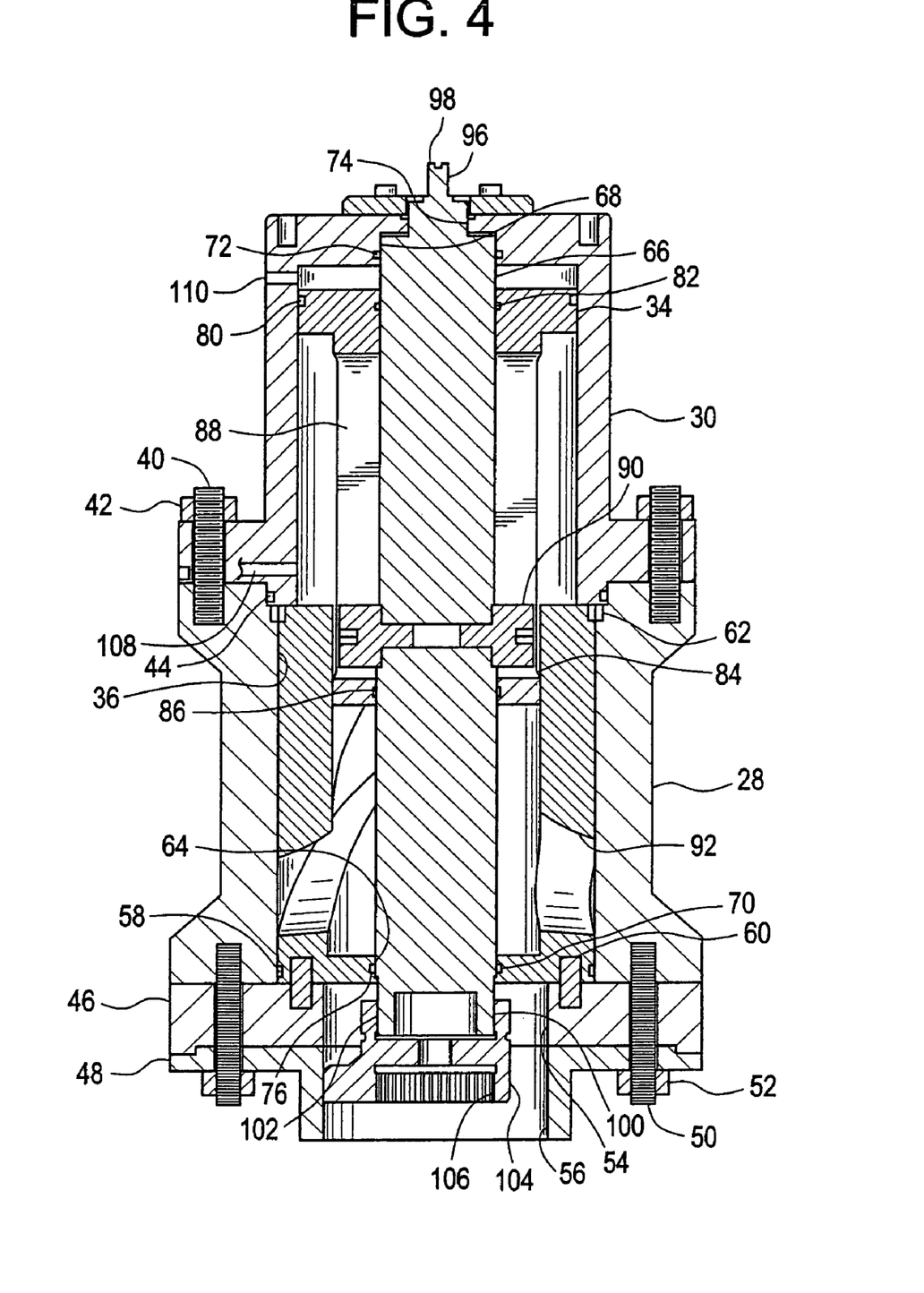
FIG. 4 comprises a sectional view of the valve actuator in the valve open position.

Actuator 14 includes lower actuator housing 28 to which actuator cylinder housing 30 is secured. Helix sleeve 32 is disposed within lower actuator housing 28 and actuator piston sleeve 34 is positioned within helix sleeve 32. Details of construction of actuator 14 and actuation of helix sleeve 32 are shown in sectional views FIGS. 3 and 4 and perspective view FIG. 5. FIG. 3 shows actuator 14 in the position of valve 12 being closed and FIG. 4 shows actuator 14 in the position of valve 12 being open. Lower actuator housing 28 has bore 36 extending therethrough. Actuator cylinder housing 30 has counter bore 38 extending therein and is secured to lower actuator housing 28 by suitable securing means as studs 40 and nuts 42. Bore 36 and counterbore 38 are axially coincident. Lower actuator housing 28 is sealed against actuator cylinder housing 30 by sealing means in the form of seal ring 44.

Lower actuator plate 46 and guide sleeve 48 are secured to the opposite end of lower actuator housing 28 by suitable securing means as studs 50 and nuts 52. Lower actuator plate 46 and guide sleeve 48 have bores 54 and 56 therethrough. Helix sleeve 32 is secured within lower actuator housing 28 by lower actuator plate 46 and actuator cylinder housing 30. Seal ring 58 seals helix sleeve 32 to lower actuator housing 28 while first and second securing means in the form of anti-rotation or dowel pins 60 and 62 between helix sleeve 32 and lower actuator housing 28 prevent helix sleeve 32 from rotational movement with respect to lower actuator housing 28 and actuator cylinder housing 30.

Helix sleeve 32 includes reduced diameter bore 64 on the end adjacent lower actuator plate 46. Actuator drive shaft 66 is a cylindrical member that extends between bore 68 in actuator cylinder housing 30 and reduced diameter bore 64 of helix sleeve 32. Actuator drive shaft 66 is sealed in bores 64 and 68 by seal rings 70 and 72, respectively. Bore 68 is axially coincident with counter bore 38 as is stepped bore 74 in actuator cylinder housing 30. Adjacent reduced diameter bore 64 is stepped bore 76 in helix sleeve 32. Stepped bores 74 and 76 act to axially restrain actuator drive shaft 66 when actuator 12 is assembled.

Figure 5:
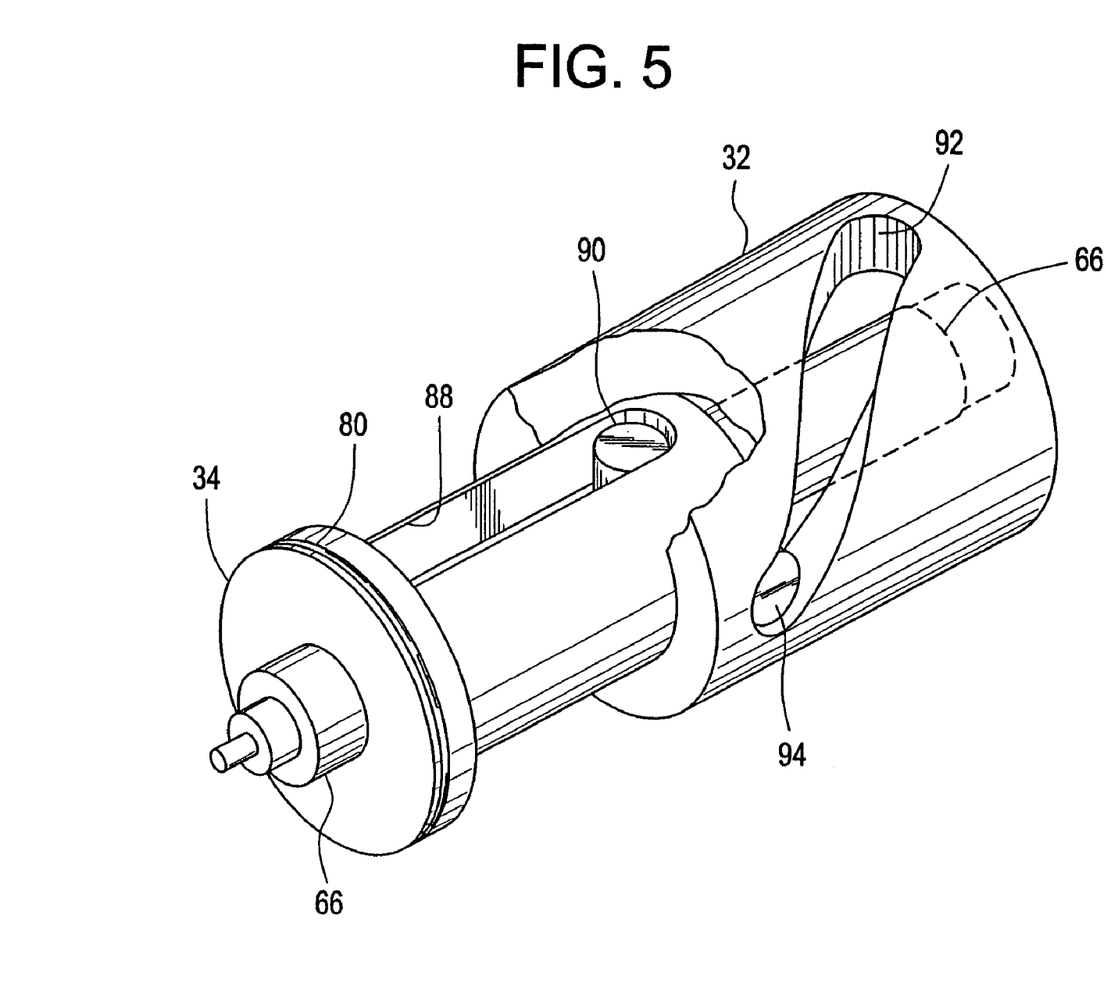
FIG. 5 comprises a perspective view of the actuator and actuation of the helix sleeve therein.

Actuator piston sleeve 34 is sealingly disposed in the annulus between actuator drive shaft 66 and counter bore 38 of actuator cylinder housing 30. Seal rings 80 and 82 seal actuator piston sleeve 34 to actuator drive shaft 66 and counter bore 38 of actuator cylinder housing 30. Actuator piston sleeve 34 has a reduced diameter portion 84 that extends into the annulus between actuator drive shaft 66 and helix sleeve 32 and seals on actuator drive shaft 66 with seal ring 86. Reduced diameter portion 84 of actuator piston sleeve 34 has a pair of axially disposed slots 88 formed therein. An actuation means in the form of a pair of rollers 90 are secured to actuator drive shaft 66 at approximately its middle and rollers 90 engage axially disposed slots 88 for purposes to be described hereinafter. Helix sleeve 32 includes a pair of helical slots 92 formed in its wall. As best seen in FIG. 5, a second actuation means in the form of a pair of rollers 94 are secured to the lower end of reduced diameter portion 84 of actuator piston sleeve 34 at right angle to axially disposed slots 88 and engage helical slots 92 in helix sleeve 32.

First end 96 of actuator drive shaft 66 extends beyond stepped bore 74 and includes indicator means or slot 98 formed thereon to indicate the rotational position of actuator drive shaft 66. Opposite or second end 100 of actuator drive shaft 66 extends beyond stepped bore 76 and includes engaging means in the form of male spline 102 formed thereon. Valve closure adapter 104 engages spline 102 and connects to valve 12 with spline 106 to transmit the torque generated by actuator 14. Ports 108 and 110 in actuator cylinder housing 30 allow pressurized hydraulic fluid, supplied by control system 16 in a manner to be described hereinafter, to operate actuator 12 in the following manner.

As noted above, FIG. 3 shows actuator 14 in the position with valve 12 closed. Actuator piston sleeve 34 is at the bottom of its stroke. When it is desired to open valve 12, pressurized hydraulic fluid to supplied to port 108 while port 110 is vented. The pressurized hydraulic fluid acts on the underside of actuator piston sleeve 34 against the annular piston area defined by seals 80 and 82 while seals 44, 58 and 70 maintain pressure in lower actuator housing 28. As actuator piston sleeve 34 is urged upwardly, slots 88 move axially over rollers 90 on actuator drive shaft 66. Simultaneously, rollers 94 on reduced diameter portion 84 of actuator piston sleeve 34 are engaging helical slots 92 of helix sleeve 32. As helix sleeve 32 is anti-rotated with respect to lower actuator housing 28 by pins 60 and 62, rollers 94 are forced to move along helical slots 92 of helix sleeve 32 which causes actuator piston sleeve 34 to rotate with respect lower actuator housing 28. This rotation of lower actuator housing 28 is transmitted through axial slots 88 and rollers 90 to actuator drive shaft 66, thus rotating valve closure adapter 104 and valve 12 through splines 106 to move valve 12 to its open position shown in FIG. 4. When it is desired to close valve 12, pressurized hydraulic fluid is supplied to port 110 while port 108 is vented to reverse the direction of rotation.

Figure 6:
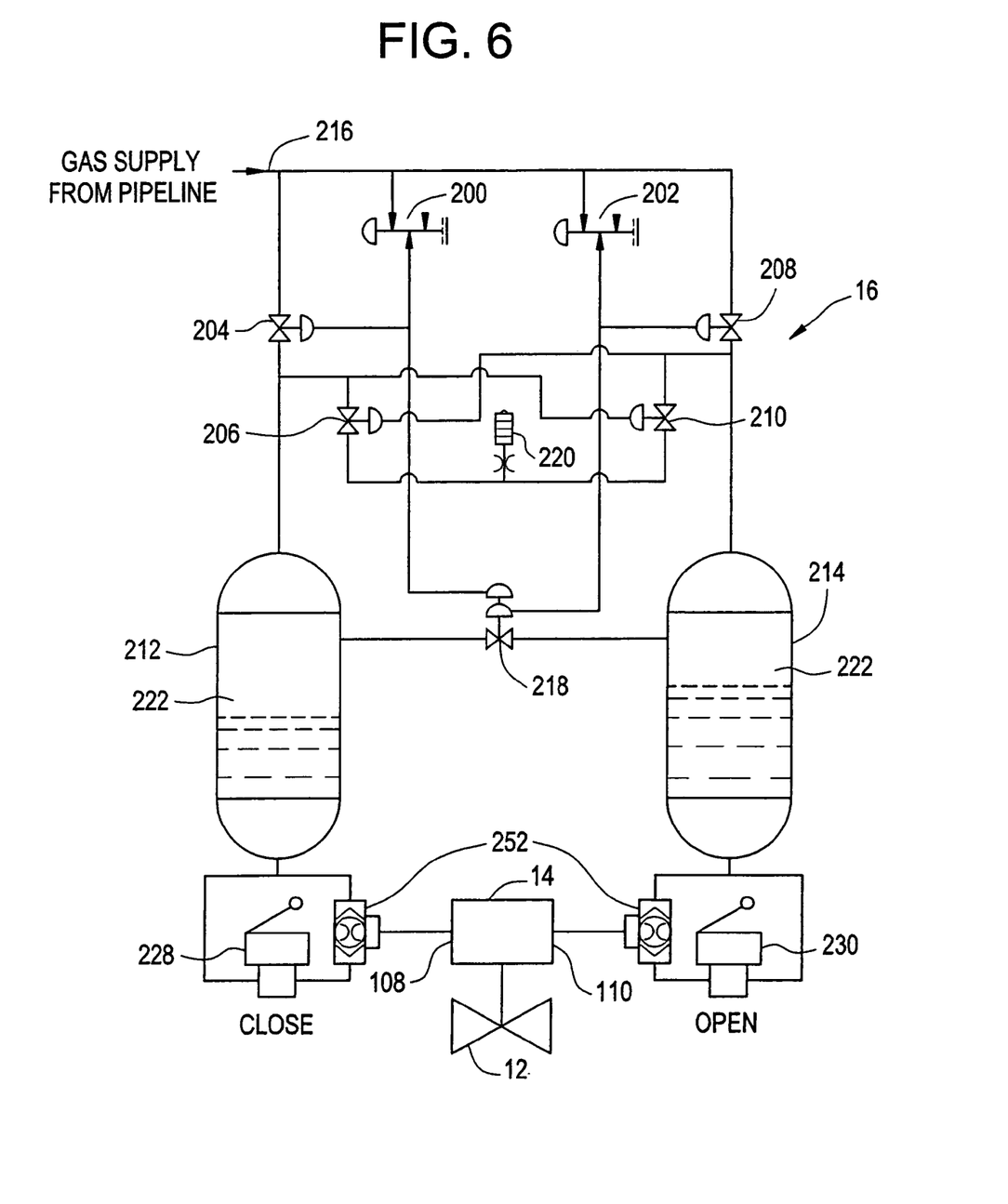
FIG. 6 comprises a schematic view of the control system.
Figure 7:
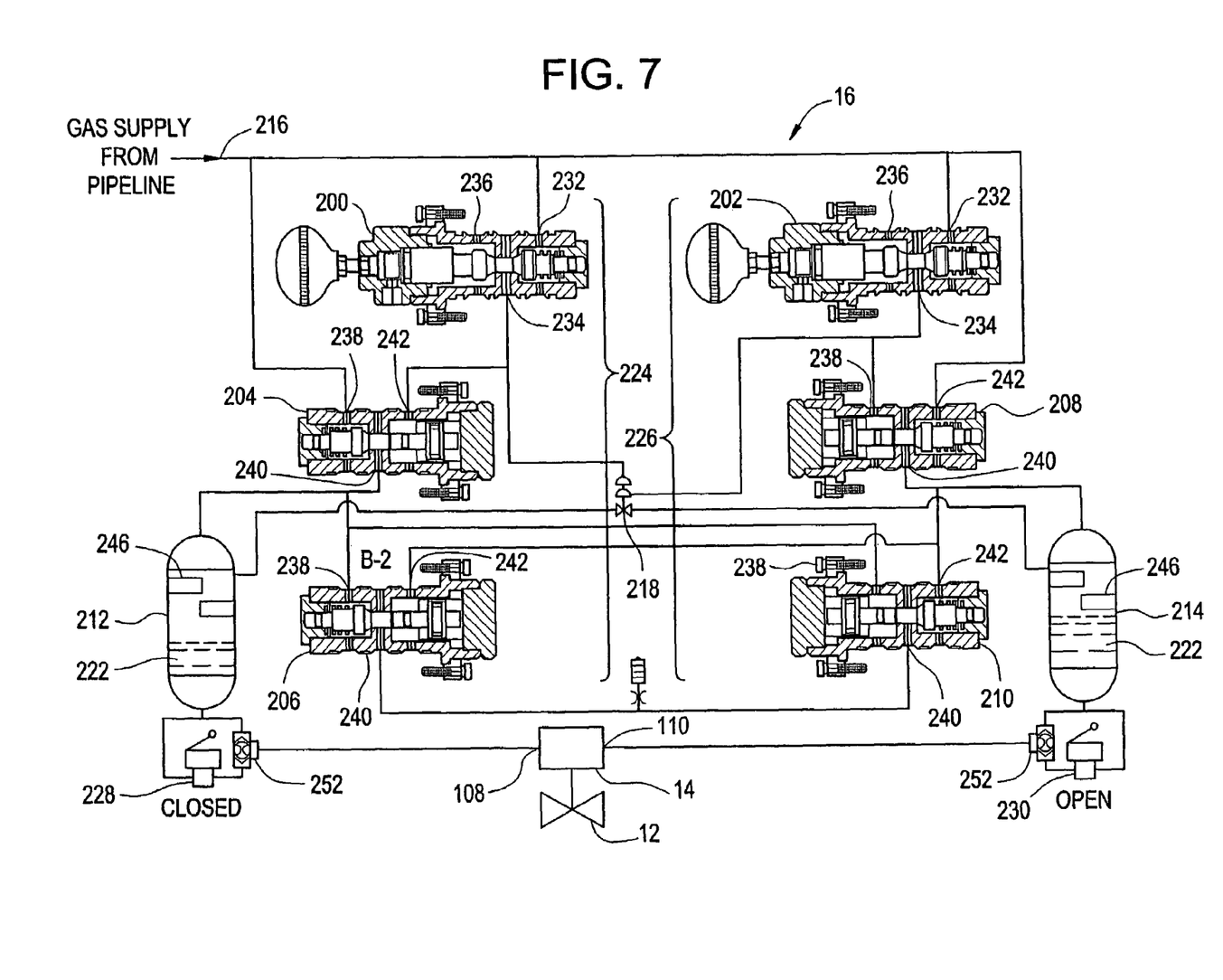
FIG. 7 comprises a view of the flow diagram of the control system.

Operation of valve 12 and actuator 14 is regulated by control system 16 which is shown in schematic form in FIG. 6 and in flow diagram form in FIG. 7. FIG. 6 shows control system 16 includes first and second control valves 200 and 202 controlling operation of actuator 14 through first through fourth pilot operated valves 204, 206, 208 and 210. Valves 200–210 control hydraulic fluid flow from first and second actuator fluid supply tanks 212 and 214 to the open and close ports 108 and 110 of actuator 14. Control system 16 includes a fluid pressure source 216 which is gas pressure supplied from the pipeline (not shown) through which valve 12 and actuator 14 control gas flow. Control system 16 further includes a normally open double pilot operated two way valve 218 to equalize gas pressure between tanks 212 and 214 which is bled to atmosphere through exhaust orifice valve 220. First and second actuator fluid supply tanks 212 and 214 have hydraulic fluid 222 in their lower portion which is the pressurized fluid supplied to actuator 14. Hydraulic fluid 222 is pressurized by the action of pipeline gas pressure acting thereon.

The flow diagram of FIG. 7 shows details of the construction of the components of control system 16 and the gas and hydraulic fluid flow therebetween. Control system 16 is divided into first and second control circuits 224 and 226. First control circuit 224 acts to supply hydraulic fluid 222 to port 108 and operate actuator 14 to close valve 12, while second control circuit 226 acts in reverse to supply hydraulic fluid 222 to port 110 and operate actuator 14 to open valve 12. Additionally, control system 16 includes manually operated hand pumps 228 and 230 mounted on first and second actuator fluid supply tanks 212 and 214, respectively, for purposes to be described hereinafter.

First and second control valves 200 and 202 are manually operated valves including inlet port 232, outlet port 234 and vent port 236. In the closed position, fluid flow between inlet port 232 and outlet port 234 is blocked while outlet port 234 is connected to vent port 236. In the open or operating position, fluid flows between inlet port 232 and outlet port 234 while vent port 236 is blocked. First through fourth pilot operated valves 204, 206, 208 and 210 are two way normally closed pilot operated valves including inlet port 238, outlet port 240 and pilot port 242. In the closed position, i.e., no pressure supplied to pilot port 242, fluid flow between inlet port 238 and outlet port 240 is blocked. In the open, i.e., pilot operated position, pilot pressure supplied to pilot port 242 allows fluid flow between inlet port 238 and outlet port 240. First and second control valves 200 and 202 and first through fourth pilot operated valves 204, 206, 208 and 210 are mounted in a manifold block (not shown) in a manner well known to those of ordinary skill in the art Control system 16 also includes double pilot operated two way valve 218 with pilot pressures supplied from first and second control circuits 224 and 226.

First and second actuator fluid supply tanks 212 and 214 are identical in construction. Tanks 212 and 214 are supplied with hydraulic fluid 222 partially filling the tanks. Baffles 246 are positioned in tanks 212 and 214 to aid in maintaining separation between the pressurized gas supplied by the pipeline and hydraulic fluid 222. Manually operated hand pumps 228 and 230 and mounted on tanks 212 and 214, respectively, and each pump 228 and 230 includes shuttle valve 252 mounted thereon.

Figure 8:
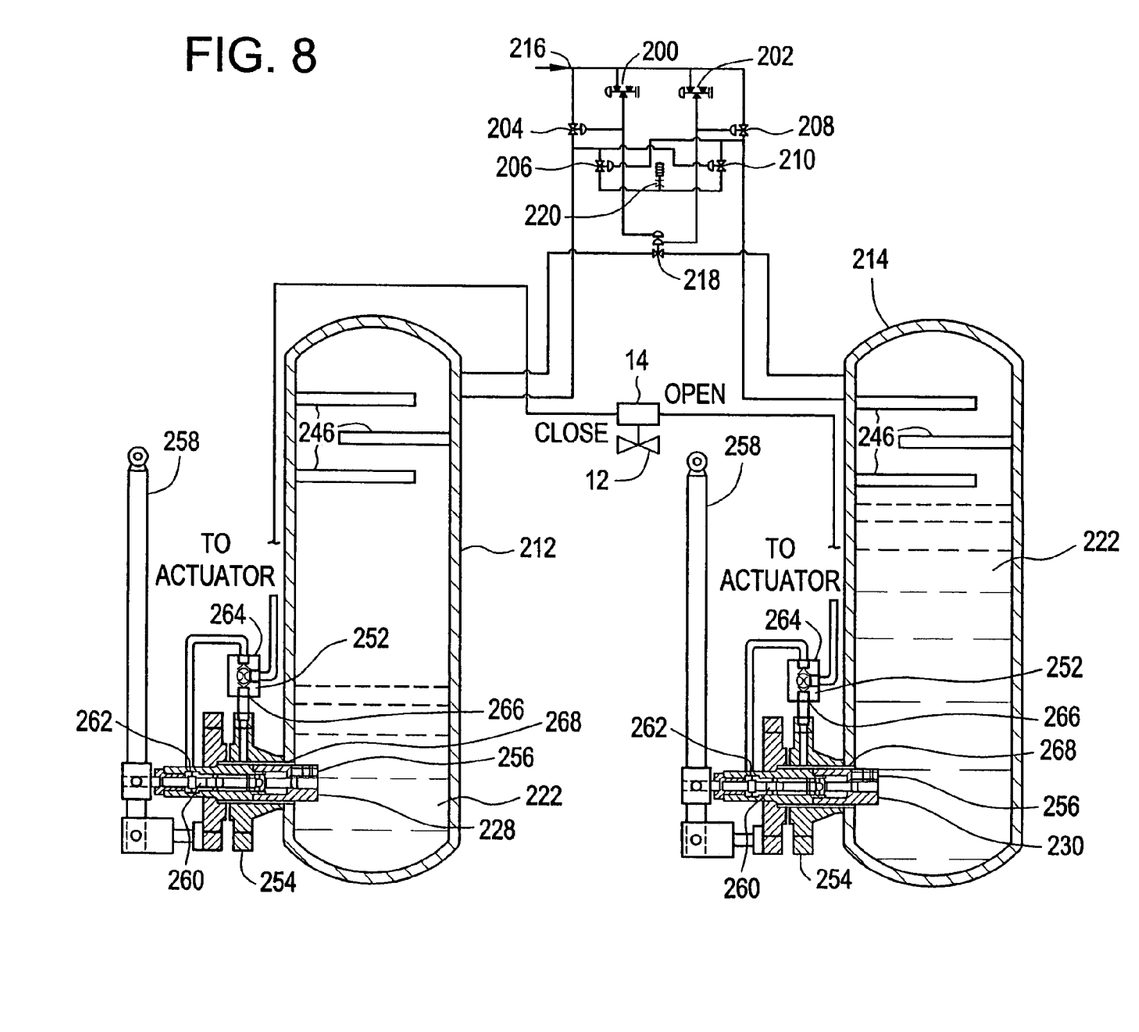
FIG. 8 comprises a sectional view of the fluid supply tanks and manually operated valves mounted thereon of the control system.

Details of construction and operation of tanks 212 and 214, pumps 228 and 230 and shuttle valves 252 are shown in FIG. 8. Only the description of tank 212, pump 228 and shuttle valve 252 are given as tank 214 and pump 230 are identical thereto. Pump 228 is mounted to tank 212 by double flange 254 with pump 248 extending into tank 212 and immersed in hydraulic fluid 222. Pump 228 is of the "sucker rod" type well known to those of ordinary skill in the art with hydraulic fluid 222 being drawn into pump 228 through spring loaded ball 256 when handle 258 is stroked away from tank 212. Hydraulic fluid 222 is pressurized in pump 228 as handle 258 is stroked toward tank 212 and unseats spring loaded ball 260 and is directed out port 262 to shuttle valve 252. Shuttle valve 252 shuttles between a position in which fluid from port 262 flows through shuttle valve 252 to outlet port 264 and to either port 108 or 110, depending on which tank is being used, and a second position in which pressurized hydraulic fluid 222 is received into port 266 and to outlet port 264. Pressurized hydraulic fluid 222 is supplied to port 266 through a by pass passage 268 in double flange 254. Pressurized hydraulic fluid 222 is only supplied to by pass passage 268 when tank 212 is pressurized by gas supplied through first and second control circuits 224 and 226.

A typical sequence of operation for control system 16 would be as follows assuming valve 12 is in the open position and it is desired to close valve 12. Referring to the flow diagram of FIG. 7, first control circuit 224, i.e., the "close" circuit, is operated by depressing first control valve 200. This operation causes the following functions to happen as pressurized gas is supplied:

(i) directs pressurized gas pressure to pilot operated normally open valve 218 to equalize pressure between actuator open fluid supply tank 214 and actuator close fluid supply tank 212;

(ii) directs pressurized gas pressure from outlet port 234 of first control circuit control valve 200 to pilot port 242 of first pilot operated valve 204 of valve closing first control circuit 224 to operate first pilot operated valve 204 and allow pressurized gas pressure to pressurize hydraulic fluid 222 in actuator close fluid supply tank 212 and supply pressurized hydraulic fluid 222 through by pass passage 268, through port 266 to outlet port 264 and thence to port 108 (close port) of actuator 14 to close valve 12; and, (iii) directs pressurized gas pressure from outlet port 240 of first pilot operated valve 204 of first control circuit 224 to pilot port 242 of fourth pilot operated valve 210 of valve opening second control circuit 226 to operate fourth pilot operated valve 210 and vent pressurized gas pressure from actuator open fluid supply tank 214 through exhaust orifice valve 220. Closure of first control circuit control valve 200 to a closed position and operation of second control circuit control valve 202 to an open position results in the same operations described above but in reverse order to open valve 12.

If pressurized gas pressure is not available as in the case of a break in the pipeline and it is necessary to close valve 12, manually operated hand pump 228 on actuator close fluid supply tank 212 may be operated. Such operation pressurizes hydraulic fluid 222 in tank 212 as described above and directs such fluid 222 through port 262 to port 108 of actuator 14 to close valve 12. Note that such operation causes shuttle valve 252 to shift and block port 264 and automatically lock out gas powered control circuit 224, if any residual pressure is present. Should opening of valve 12 be desired, pump 230 in actuator open fluid supply tank 214 may be operated to reverse operation and open valve 12.

The construction of our system for controlling fluid flow through a pipeline including valve, actuator and control system will be readily understood from the foregoing description and it will be seen that we have provided a system that allows minimizing the size of the actuator and operation of the control system in a manual mode that automatically prevents accidental operation by pipeline pressure while minimizing the condensate vented to the atmosphere during operation. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A hydraulic control system for a valve actuator, comprising:
    a first control valve that regulates fluid communication from a fluid pressure source to a first fluid supply tank that is fluidly connected to the valve actuator;
    a second control valve that regulates fluid communication from the fluid pressure source to a second fluid supply tank that is fluidly connected to the valve actuator;
    a flow control member that regulates fluid communication between the first and second fluid supply tanks; and
    an exhaust valve that regulates fluid communication between the first and second fluid supply tanks and an outlet.

2. The hydraulic control system of claim 1 wherein the control system has a first actuation mode wherein the first control valve is in an open position such that the fluid pressure source is fluidly connected to the valve actuator and a second actuation mode wherein the second control valve is in an open position such that the fluid pressure source is fluidly connected to the valve actuator.

3. The hydraulic control system of claim 1 wherein the control system has a balanced mode wherein said flow control member is in an open position such that the first fluid supply tank is fluidly connected to the second fluid supply tank.

4. The hydraulic control system of claim 1 wherein the control system has an exhaust mode wherein said first and second control valves fluidly isolate the first and second fluid supply tanks from the fluid pressure source and said exhaust valve is in an open position such that the first and second fluid supply tanks are fluidly connected to the outlet.

5. The hydraulic control system of claim 1, wherein the fluid pressure source is a gas pressurized pipeline fluidly connected with the valve actuator.

6. The hydraulic control system of claim 1, wherein the fluid pressure source supplies a pressurized gas and said first and second fluid supply tanks are partially filled with a fluid such that a pressurized fluid is supplied to the actuator.

7. The hydraulic control system of claim 6 wherein each of said first and second fluid supply tanks further comprise baffles.

8. The hydraulic control system of claim 1, wherein each of said first and second fluid supply tanks comprises a manually operated pump that is operable to supply pressurized fluid to the actuator independent of the fluid pressure source.

9. The hydraulic control system of claim 8 wherein said manually operated pumps are operable independently of said first and second control valves.

10. A method for operating a hydraulic control system comprising:
    operating a first control valve so as to fluidly connect a first fluid supply tank to a fluid pressure source, wherein pressurized fluid within the first fluid supply tank is transferred to an actuator so as to move the actuator to a first position;
    operating a flow control member so as to fluidly connect the first fluid supply tank to a second fluid supply tank, wherein the second fluid supply tank is fluidly connected to the valve actuator and fluidly connecting the first and second fluid supply tanks will equalize pressure within the tanks;
    operating the first control valve so as to fluidly isolate the first fluid supply tank from the fluid pressure source; and
    operating an exhaust valve so as to fluidly connect the first and second fluid supply tanks to an outlet so as to reduce pressure within the tanks.

11. The method of claim 10, further comprising:
    operating a second control valve so as to fluidly connect the second fluid supply tank to the fluid pressure source, wherein pressurized fluid within the second fluid supply tank is transferred to an actuator so as to move the actuator to a second position;
    operating the flow control member so as to fluidly connect the first fluid supply tank to the second fluid supply tank so as to equalize pressure within the tanks;
    operating the second control valve so as to fluidly isolate the second fluid supply tank from the fluid pressure source; and
    operating the exhaust valve so as to fluidly connect the first and second fluid supply tanks to an outlet so as to reduce pressure within the tanks.

12. The method of claim 10, wherein the fluid pressure source is a gas pressurized pipeline fluidly connected with a valve operated by the actuator.

13. The method of claim 10, wherein each of said first and second fluid supply tanks further comprise baffles.

14. The method of claim 10, wherein each of said first and second fluid supply tanks comprises a manually operated pump that is operable to supply pressurized fluid to the actuator independent of the fluid pressure source.

15. The method of claim 14, wherein said manually operated pumps are operable independently of said first and second control valves.

16. The control system of claim 14, wherein said manually operated pumps are operable independently of said first and second control valves.

17. A hydraulic actuator control system comprising:
   a valve manifold comprising an inlet port, a first control valve, a second control valve, a flow control valve, and an exhaust valve;
   a first fluid supply tank fluidly connected to the first control valve and to the actuator;
   a second fluid supply tank fluidly connected to the second control valve and to the actuator; and
   a pressure source fluidly connected to the inlet port of said valve manifold.

18. The control system of claim 17 wherein the flow control valve is operable to fluidly connect said first fluid supply tank to said second fluid supply tank so as to equalize pressure within the tanks.

19. The control system of claim 17 wherein the exhaust valve is operable to vent pressure within said first and second fluid supply tanks.

20. The control system of claim 17, wherein each of said first and second fluid supply tanks comprises a manually operated pump that is operable to supply pressurized fluid to the actuator independent of the pressure source.

* * * * *